(12) United States Patent
Liu et al.

(10) Patent No.: US 11,480,754 B2
(45) Date of Patent: Oct. 25, 2022

(54) MULTI-GROUP LENS ASSEMBLY, CAMERA MODULE AND ASSEMBLY METHOD THEREOF, AND ELECTRONIC DEVICE

(71) Applicant: Ningbo Sunny Opotech Co., Ltd., Yuyao (CN)

(72) Inventors: Chunmei Liu, Yuyao (CN); Mingzhu Wang, Yuyao (CN); Zhenyu Chen, Yuyao (CN); Nan Guo, Yuyao (CN)

(73) Assignee: NINGBO SUNNY OPOTECH CO., LTD., Yuyao Ningbo (CN)

( * ) Notice: Subject to any disclaimer, the term of this patent is extended or adjusted under 35 U.S.C. 154(b) by 133 days.

(21) Appl. No.: 16/625,986

(22) PCT Filed: Jun. 14, 2018

(86) PCT No.: PCT/CN2018/091254
§ 371 (c)(1),
(2) Date: Dec. 23, 2019

(87) PCT Pub. No.: WO2018/233540
PCT Pub. Date: Dec. 27, 2018

(65) Prior Publication Data
US 2021/0278622 A1      Sep. 9, 2021

(30) Foreign Application Priority Data

Jun. 23, 2017   (CN) .......................... 201710484737.9

(51) Int. Cl.
*G02B 7/02*      (2021.01)
*G02B 7/00*      (2021.01)

(52) U.S. Cl.
CPC ............. *G02B 7/023* (2013.01); *G02B 7/003* (2013.01); *G02B 7/025* (2013.01)

(58) Field of Classification Search
CPC . G02B 7/00; G02B 7/02; G02B 7/023; G02B 7/08; G02B 7/021; G02B 7/026;
(Continued)

(56) References Cited

U.S. PATENT DOCUMENTS

| 2015/0002942 A1* | 1/2015 | Chen ................... G02B 13/0045 |
| | | 359/664 |
| 2015/0301303 A1* | 10/2015 | Kim ..................... B32B 37/142 |
| | | 348/373 |

(Continued)

FOREIGN PATENT DOCUMENTS

| CN | 101295070 A | 10/2008 |
| CN | 101470256 A | 7/2009 |

(Continued)

OTHER PUBLICATIONS

English translation of KR 20140076761, machine translated on Mar. 7, 2022 (Year: 2014).*

(Continued)

*Primary Examiner* — Jie Lei
(74) *Attorney, Agent, or Firm* — Maier & Maier, PLLC (57) ABSTRACT

A multi-group lens assembly includes a plurality of lens group units and at least one assembly structure. The assembly structure is for assembling two adjacent lens group units. Lenses in the lens group units are made of any two or three of a glass material, a resin material, and a glass-resin composite material. Alternatively, the lenses are made of only the glass-resin composite material. The lenses can be assembled and adjusted easily and conveniently and have high pixel densities and small TTLs, thereby improving user experience.

17 Claims, 7 Drawing Sheets

(58) Field of Classification Search
CPC .......... G02B 7/003; G02B 7/025; G02B 9/60; G02B 1/041; G02B 5/005; G02B 5/208; G02B 5/003; G02B 13/0015; G02B 13/0045; H04N 5/225; H04N 5/2253; H04N 5/2254; H04N 17/002
USPC ....... 359/819, 809, 811, 818, 813, 703, 704, 359/706, 611, 691, 694
See application file for complete search history.

(56) References Cited

U.S. PATENT DOCUMENTS

| | | | | |
|---|---|---|---|---|
| 2017/0160509 A1* | 6/2017 | Wang | .................... | H04N 5/2254 |
| 2017/0184812 A1* | 6/2017 | Yoon | ...................... | G02B 5/208 |

FOREIGN PATENT DOCUMENTS

| | | |
|---|---|---|
| CN | 201344989 Y | 11/2009 |
| CN | 101963692 A | 2/2011 |
| CN | 202870378 U | 4/2013 |
| CN | 105005131 A | 10/2015 |
| CN | 105445889 A | 3/2016 |
| CN | 207067513 U | 3/2018 |
| CN | 109116509 A | 1/2019 |
| EP | 2259096 A1 | 12/2010 |
| JP | 61-13817 U | 1/1986 |
| JP | 2009005328 A | 1/2009 |
| JP | 2010-243619 A | 10/2010 |
| JP | 2012-533775 A | 12/2012 |
| JP | 2016-051076 A | 4/2016 |
| KR | 20140076761 A | 6/2014 |
| KR | 20150120735 A | 10/2015 |
| WO | 2011076634 A1 | 6/2011 |

OTHER PUBLICATIONS

Office Action dated Jul. 23, 2021 in Korean Application No. 10-2020-7002416.
Extended European Search Report dated May 13, 2020 in European Application No. 18821055.3.
Int'l Search Report dated Sep. 12, 2018 in Int'l Application No. PCT/CN2018/091254.
Office Action dated Mar. 17, 2022 in Korean Applicaiton No. 10-2020-7002416.
Office Action dated Feb. 1, 2021 in Chinese Application No. 201880027359.4.
Decision to Grant a Patent dated Apr. 28, 2022 in corresponding Japanese Application No. 2019-570866; 5 pages including English-language translation.

* cited by examiner

MULTI-GROUP LENS ASSEMBLY, CAMERA MODULE AND ASSEMBLY METHOD THEREOF, AND ELECTRONIC DEVICE

CROSS-REFERENCE TO RELATED APPLICATIONS

This application is a Section 371 of International Application No. PCT/CN2018/091254, filed Jun. 14, 2018, which was published in the Chinese language on Dec. 27, 2018, under International Publication No. WO 2018/233540 A1, which claims priority under 35 U.S.C. § 119(b) to Chinese Application No. 201710484737.9, filed Jun. 23, 2017, the disclosures of which are incorporated herein by reference in their entirety.

TECHNICAL FIELD

The invention relates to the technical field of optical devices, and in particular to a multi-group lens assembly, a camera module and an assembly method thereof, and an electronic device.

BACKGROUND

As important parts of camera modules, lenses have a direct influence on the imaging quality of the camera modules.

With regard to traditional optical lenses, a plurality of lenses is assembled in the same lens barrel, and relative positions of the lenses are basically determined and cannot be adjusted. Once the lenses are assembled in the lens barrel, the quality of the optical lenses is determined, so that high machining precision of the lens barrel and the lenses is required. The optical lenses are independently assembled parts which comprise a lens barrel (including an aperture member), lenses, space rings, a press ring, and the like. A lens has a tolerance when leaving the factory, and different lenses have different tolerances. During assembly, space rings and lenses are sequentially assembled in the lens barrel, and the last lens is fixed with glue or one press ring, so that the optical lenses are assembled. Such assembly manner may also generate tolerances, which include an assembly tolerance of the lenses and the space rings and an assembly tolerance of the lenses and the optical lenses. Due to an overlong assembly tolerance chain, a high assembly cost, poor assembly position precision of the lenses, and the tolerance of the lenses, such assembly manner will greatly affect the quality of the optical lenses, and consequentially, the quality of the whole camera modules and products using the camera modules is affected.

The requirement for the quality of the lenses used for photographing is extremely high, and the lenses are made of a resin material, an optical glass material, or a glass-resin composite material. In general, the density of glass is higher than that of resin, and the reflectivity of the glass is higher than that of the resin, so the requirement of the plating antireflection film process for the glass is far higher than that of plating antireflection film process for the resin. Similarly, during assembly and alignment, the difficulty of alignment and assembly precision of the glass is greater than that of the resin. Common glass lenses actually have light transmittance of 90% because about 10% of light is reflected; the reflectivity of the resin is lower than that of the glass, resin lenses actually have light transmittance of 92% because about 8% of light is reflected, which means that the light transmittance of the resin is higher than that of the glass.

Nevertheless, the problem of low light transmittance of the glass can be solved by film coating. Besides, the refractive index and Abbe coefficient ranges of the glass are broader than those of the resin, so that glass lenses can be very thin to decrease the TTLs (Total Track Length) of the optical lenses, and accordingly, the overall thickness of a camera module and the thickness of an electronic device provided with the camera module are reduced. However, with the increase of demands for high-pixel imaging, the number of the lenses is increased, for instance, the number of the lenses has reached five, six, or more, and the cost is increased correspondingly; and if all lenses are glass lenses, the cost will be much higher than that of the resin lenses.

The camera modules comprise an optical lens and a photosensitive assembly including a photosensitive chip, wherein the optical lens is arranged at a photosensitive path of the photosensitive chip, and light reflected from an object enters the camera modules via the optical lens and is received by the photosensitive chip for photoelectric conversion, so that the camera modules can subsequently obtain an image related to the object. The optical lens is generally formed by packaging of a plurality of lenses with overlap, the position of the central axis of each lens may affect the central axis of the optical lens formed by a group of lenses, and the optimum condition is that the central axes of all the lenses coincide with one another. However, due to the limit of the tolerance of the lens and packaging and fabrication process, there will be some deviation in the central axes of the lenses to a certain extent. Besides, in the process of configuring the lenses in the optical lens with a bonding medium or by welding, the bonding medium and welding substances may affect the position and inclination of each lens, which in turn results in a large deviation of the central axis of the packaged optical lens, and consequentially, the imaging quality of the camera modules is inevitably affected, and the yield of the camera modules is difficult to control and guarantee.

When the camera modules are assembled, overall central axes of the lens and the photosensitive chip are kept relatively consistent within a permitted deviation range through active alignment (AA). In view of the aforementioned existing problems, limited by the lens materials, the packaging process, and the fabrication process, the active alignment of adjustable optical elements such as the traditional lenses and the photosensitive assemblies as well as the photosensitive assemblies and diagrams is very difficult. Besides, with the increase of the lens number, the precision requirement, assembly difficulty, and alignment difficulty of the optical lenses and the camera modules likewise become higher and higher.

The invention patent application Publication No. CN103163582A discloses a glass lens and a lens module using the same, and concretely discloses a lens module comprising a lens barrel and at least one glass lens received in the lens barrel. The glass lens includes an object side and an image side opposite to the object side, and light projected to the object side is converged or diverged by glass and projected out of the image side. The glass lens is made of a material capable of absorbing infrared light to absorb infrared light in the light passing through this glass lens. In this invention patent application, although the glass lens is adopted, it only proposed an improvement to solve the problem of large lens size and high production cost of existing lens modules caused by the configuration of an optical filter, and the glass capable of filtering out the infrared light is adopted to omit the optical filter. Besides, the glass lens is arranged in a traditional lens barrel, so the problems of large assembly tolerance, complex assembly and alignment procedures of lenses and camera modules, high technical difficulty, large time consumption, high cost, and the like still exist; the problems of high requirements for machining process and alignment and assembly precision caused by the high reflectivity and low light transmittance of the glass remain unsolved, and improvements for adaptive assembly and alignment of the lenses and the camera modules have not been made.

The invention patent application Publication No. CN101231380A discloses a photographing lens, a photographing device, and a portable terminal, and concretely discloses a photographing lens comprising a plurality of lenses. In the plurality of lenses, the lens having the maximum positive refraction capacity is a glass lens made of a glass material, and other lenses are resin lenses made of hard resin materials. In this application, although glass and resin are used as lens materials to reduce costs to a certain extent and hard resin materials having excellent heat resistance is primarily adopted to fulfill the characteristics of heat resistance in a backflow procedure, and smaller image point positions during temperature change of the lenses, the problems involved in the invention patent application Publication No. CN103163582A still remain unsolved.

At present, the precision of glass lens is lower than that of resin lens, especially high-precision glass of medium-quality and high-quality lenses is very difficult to produce and is the priority development in the lens industry. The precision of existing glass lenses is improved through improvements on the machining process, for instance, the Chinese Patent Application Publication No. CN103128516A discloses a high-precision batch-fabrication technology for aspheric glass lens, and provides a novel aspheric glass lens hot-molding technology based on a Ni—P and Ni—Co composite layer mould. In this invention application, the glass precision is improved through the fabrication technology. However, the problems of lens precision, precision between the lenses, and package precision still remain unsolved when the glass is subsequently assembled on a lens to be used in combination with resin glass or glass-resin composite glass for instance.

The prior invention application Publication No. CN105445885A of the applicant discloses an adjustable optical lens, a camera module and a fabrication method thereof, and concretely discloses that an adjustable optical lens comprises an optical structural component and at least two optical lenses which are arranged in an internal space of the optical structural component in the height direction of the optical structural component, wherein at least one optical lens can be adaptively adjusted in the internal space of the optical structural component. Although the applicant solves the problems of non-adjustable lenses and low machining and packaging quality and poor imaging quality caused by one-piece structures of lenses and fulfills the objective of adjusting the optical path of the optical lens through an adjustment of one lens or more lenses as a group in the optical lens and an adjustment of at least one of horizontal, vertical, oblique, and rotary directions of a movable part of the optical lens of the assembled module, under the condition where the camera module is easy to assemble and low in cost, how to better adjust the lenses and how to fix the lenses after the adjustment to guarantee good imaging quality is an issue urgently to be settled in the field of camera module.

SUMMARY

Technical Issues

The objective of the invention is to provide an optical lens, a camera module and an assembly method thereof, and an electronic device which pays attention to costs, can be assembled and adjusted easily and conveniently, and have high imaging pixel and small TTLs, thereby improving user experience.

Technical Solution

The invention provides a multi-group lens assembly to fulfill the above-mentioned objective. The multi-group lens assembly comprises:

a plurality of lens group units; and at least one assembly structure for assembling two adjacent lens group units;

Wherein lenses in each lens group unit are made of any two or three of a glass material, a resin material, and a glass-resin composite material.

Preferably, the lens group unit closest to an object side includes at least one glass lens or glass-resin composite lens.

Preferably, the lens, closest to the object side, in the lens group unit closest to the object side is the glass lens or the glass-resin composite lens.

Preferably, the lens group unit closest to an image side includes at least one glass lens or glass-resin composite lens.

Preferably, the assembly structure is an independent part independent of the lens group units.

Preferably, the lens group unit, close to the object side, in two adjacent lens group units is an upper lens group unit including an upper lens group and an upper bearing part allowing the upper lens group to be arranged thereon;

The lens group unit, close to the image side, in two adjacent lens group units is a lower lens group unit including a lower lens group and a lower bearing part allowing the lower lens group to be arranged thereon; and The upper bearing part is assembled on the lower bearing part through the assembly structure.

Preferably, the upper bearing part includes:

An upper main bearing body allowing the upper lens group to be arranged thereon; and An upper outward extension part extending outwards from the upper main bearing body;

The lower bearing part includes:

A lower main bearing body allowing the lower lens group to be arranged thereon;

A lower inward extension part extending inwards from the lower main bearing body; and A lower overlap part arranged on the lower main bearing body;

Wherein, the lower overlap part, the upper outward extension part, and the lower inward extension part form the assembly structure cooperatively; and when the upper outward extension part is overlapped with the lower overlap part, the lower inward extension part extends into the upper main bearing body so as to be restrained by the upper lens group unit.

Preferably, the upper outward extension part includes an upper extension part extending towards the lower lens group unit.

Preferably, the upper main bearing body has an upper main bearing body matching groove, and the upper outward extension part includes an upper extension part extending towards the lower lens group unit and an upper matching groove; wherein the upper main bearing body matching groove communicating with upper matching groove in the extension direction of the upper outward extension part.

Preferably, an adjustment gap is reserved between the upper lens group unit and the lower inward extension part.

Preferably, the adjustment gap between the upper lens group unit and the lower inward extension part is 0.1%-300% of the minimum thickness of each lens.

Preferably, an adjustment gap is reserved between the upper outward extension part and the lower inward extension part.

Preferably, the adjustment gap between the upper outward extension part and the lower inward extension part is 0.1%-300% of the minimum thickness of each lens.

Preferably, an adjustment gap is reserved between the upper extension part and the lower overlap part.

Preferably, the adjustment gap between the upper extension part and the lower overlap part is 0.1%-300% of the minimum thickness of each lens.

Preferably, a lower matching groove is formed in the lower overlap part to accommodate one or more of a bonding medium, a welding medium, and the assembly structure.

Preferably, the lower matching groove is partially covered with a part of the upper outward extension part overlapped with the lower overlap part in the axial direction of the multi-group lens assembly.

Preferably, the top of the lower overlap part is flush with the top of the lower matching groove.

Preferably, the lower overlap part includes a lower extension part extending towards the upper lens group unit.

Preferably, an adjustment gap is reserved between the lower extension part and the upper outward extension part.

Preferably, the adjustment gap between the lower extension part and the upper outward extension part is 0.1%-300% of the minimum thickness of each lens.

Preferably, a free end of the lower extension part at most extends to be flush with the uppermost end of the multi-group lens assembly.

Preferably, the free end of the lower extension part at least extends to be flush with a free end of the upper main bearing body.

Preferably, a lower matching groove between the lower extension part and the lower inward extension part is formed in the lower overlap part.

Preferably, at least a part, close to the upper face of the lower extension part, of the internal side of the lower extension part is an inclined plane.

Preferably, the lower extension part and the upper outward extension part are cooperatively assembled with a bonding medium and/or a welding medium.

Preferably, the bonding medium is one or more of a UV adhesive, a thermosetting adhesive, a UV thermosetting adhesive, an, epoxy resin adhesive, a moisture curing adhesive, and a pressure-sensitive adhesive.

Preferably, the upper bearing part includes:

The upper main bearing body allowing the upper lens group to be arranged thereon; and The lower bearing part includes:

The lower main bearing body allowing the lower lens group to be arranged thereon; and The lower inward extension part extending inwards from the lower main bearing body; and The lower overlap part arranged on the lower main bearing body;

Wherein, the lower overlap part and the lower inward extension part form the assembly structure cooperatively; and when the upper main bearing body is overlapped with the lower overlap part, the lower inward extension part extends into the upper main bearing body so as to be restrained by the upper lens group unit.

Preferably, the lower matching groove is formed in the lower overlap part to accommodate one or more of a bonding medium, a welding medium, and the assembly structure.

Preferably, the top of the lower overlap part is flush with the top of the lower matching groove.

Preferably, the lower overlap part includes the lower extension part extending towards the upper lens group unit.

Preferably, an adjustment gap is reserved between the lower extension part and the upper main bearing body.

Preferably, the adjustment gap between the lower extension part and the upper main bearing body is 0.1%-300% of the minimum thickness of each lens.

Preferably, the free end of the lower extension part at most extends to be flush with the uppermost end of the multi-group lens assembly.

Preferably, the free end of the lower extension part at least extends to be flush with the free end of the upper main bearing body.

Preferably, the lower matching groove between the lower extension part and the lower inward extension part is formed in the lower overlap part.

Preferably, at least the part, close to the upper face of the lower extension part, of the internal side of the lower extension part is the inclined plane.

Preferably, the adjustment gap is reserved between the upper lens group unit and the lower inward extension part.

Preferably, the adjustment gap between the upper lens group unit and the lower inward extension part is 0.1%-300% of the minimum thickness of each lens.

Preferably, the bonding medium is one or more of the UV adhesive, the thermosetting adhesive, the UV thermosetting adhesive, the epoxy resin adhesive, the moisture curing adhesive, and the pressure-sensitive adhesive.

Preferably, at least one lens group unit includes at least one space ring.

Preferably, the adjacent lens group units are assembled in an active alignment manner.

The invention further provides an assembly method of a multi-group lens assembly for assembling the above-mentioned multi-group lens assembly. The method comprises the following steps:

S01, assembling the lens group units;

S02, determining relative positions of two adjacent lens group units in an active alignment manner; and S03, fixing the lens group units to form the multi-group lens assembly.

The invention further provides a camera module which comprises the multi-group lens assembly and a photosensitive assembly, wherein the multi-group lens assembly is located at a photosensitive path of the photosensitive assembly.

Preferably, the camera module further comprises a drive element allowing the multi-group lens assembly to be arranged thereon.

The invention further provides an assembly method of a camera module for assembling the camera module. The method comprises:

Step S11, assembling at least one lens group unit and the drive element to obtain a drive lens assembly;

Step S12, assembling the drive lens assembly on the photosensitive assembly; and Step S13, assembling the remaining lens group units on the drive lens assembly to form the camera module.

Preferably, the step S12 is carried out in an active alignment manner.

Preferably, the step S13 is carried out in an active alignment manner.

The invention further provides an assembly method of a camera module for assembling the camera module. The method comprises:

Step S11', assembling all lens group units to obtain the multi-group lens assembly;

Step S12', assembling the multi-group lens assembly and the drive element to obtain a drive lens assembly; and Step S13', assembling the drive lens assembly on the photosensitive assembly to form the camera module.

Preferably, the step S13' is carried out in an active alignment manner.

The invention further provides an electronic device which comprises the camera module.

Beneficial Effect

The multi-group lens assembly, the camera module and the assembly method thereof, and the electronic device can be assembled and adjusted easily and conveniently, pay attention to the economic costs, and have high imaging pixel and small TTLs, thereby improving user experience.

10, multi-group lens assembly; 11, upper lens group unit; 111, upper lens group; 112, upper bearing part; 1121, upper main bearing body; 1121C, upper main bearing body matching groove; 1122, upper outward extension part; 11221, upper extension part; 1122C, upper matching groove; 12, lower lens group unit; 121, lower lens group; 122, lower bearing part; 1221, lower main bearing body; 1222, lower inward extension part; 1223, lower overlap part; 1223C, lower matching groove; 13, bonding medium; 14, space ring; 15, press ring; 16, upper lens group unit assembly table; 17, lower lens group unit assembly table;

21, upper lens group unit; 211, upper lens group; 212, upper bearing part; 2121, upper main bearing body; 2121C, upper main bearing body matching groove; 2122, upper outward extension part; 2122Z, free end of upper outward extension part; 21221, upper extension part; 2122C, upper matching groove; 22, lower lens group unit; 221, lower lens group; 222, lower bearing part; 2221, lower main bearing body; 2222, lower inward extension part; 2223, lower overlap part; 22231, lower extension part; 22232, lower matching groove; 22231Z, free end of lower extension part; 22231Q, inclined plane of lower extension part; 23, bonding medium; 24, space ring; 25, press ring;

31, upper lens group unit; 311, upper lens group; 312, upper bearing part; 3121, upper main bearing body; 3121C, upper main bearing body matching groove; 3121Z, free end of upper main bearing body; 3122C, upper matching groove; 32, lower lens group unit; 321, lower lens group; 322, lower bearing part; 3221, lower main bearing body; 3222, lower inward extension part; 3223, lower overlap part; 32231, lower extension part; 32232, lower matching groove; 32231Z, free end of lower extension pan; 32231Q, inclined plane of lower extension part; 33, bonding medium; 34, space ring; 35, press ring; 36, metal sheet;

41, upper lens group unit; 411, upper lens group; 412, upper bearing part; 4121, upper main bearing body; 4121C, upper main bearing body matching groove; 4121Z, free end of upper main bearing body; 4122, upper outward extension part; 41221, upper extension part; 4122C, upper matching groove; 42, lower lens group unit; 421, lower lens group; 422, lower bearing part; 4221, lower main bearing body; 4222, lower inward extension part; 4223, lower overlap part; 42231, lower extension part; 42232, lower matching groove; 42231Z, free end of lower extension pan; 42231Q, inclined plane of lower extension part; 43, bonding medium; 44, space ring; 45, press ring;

20, photosensitive assembly; 201, photosensitive element; 202, circuit board; 203, base; 30, drive element; 40, optical filter element.

DETAILED DESCRIPTION OF EMBODIMENTS

The following description is used for explaining the invention to make those skilled in the art implement the invention. The preferred embodiments in the following description are only illustrative ones, and other obvious modifications can be obtained by those skilled in the art. The basic principle, defined in the following description, of the invention can be applied to other implementation solutions, modification solutions, improvement solutions, equivalent solutions, and other technical solutions which do not deviate from the spirit and scope of the invention.

Those skilled in the art should appreciate that in the disclosure of the invention, the directional or positional relations indicated by terms such as "longitudinal", "transverse", "upper", "lower", "front", "rear", "left", "right", "vertical", "horizontal", "top", "bottom", "internal", and "external" are based on methods or positional relationships shown in the accompanying drawings, these terms are only used for facilitating and simplifying the description of the invention, and do not indicate or imply that devices or elements referred to must have specific directions or must be formed and operated in specific directions, and these terms should not be construed as limitations of the invention.

Traditional optical lenses, especially lenses applied to camera modules, are formed by packaging of a plurality of lenses with overlap in one lens. When the number of the lenses is small such as two or three, assembly errors of such structure are small. With the increase of demands for high pixels and high imaging quality of the lenses and the camera modules, the number of the lenses is increased, assembly error generated by traditional packaging is accumulated, and consequentially, the traditional structure of the optical lenses cannot meet the requirements for the lenses and the camera modules.

Generally, the optical lenses are lenses made of resin materials. On one hand, the refractive index and Abbe coefficient of the resin lenses are smaller than those of glass lenses, so in order to obtain the same identical optical effect, the resin lenses should be thicker than the glass lenses, and lenses formed by the resin lenses should be longer than lenses formed by the glass lenses. The difference in length of the lenses formed by the resin lenses and the lenses formed by the glass lenses will be more obvious with the increase in the number of lenses. The length of the lens TTL has a significant influence on the thickness of the camera module and electronic device used for packaging the camera modules. On one hand, both the weight and the cost of glass lens are higher than those of the resin lenses, and the light transmittance of glass lens is slightly lower than that of resin lens (the light transmittance of glass lens can be improved through film coating). On the other hand, according to recent research, novel glass-resin composite lenses still have application problems in precision, optical effect, and so on. The invention aims to obtain an optical lens, a camera module, and an electronic device, which fulfil high-quality imaging, meet the requirement for high pixels, and can be aligned accurately and conveniently, by combining the advantages and disadvantages of the glass lenses and the resin lenses, the resin lenses and the glass-resin composite lenses, the glass-resin composite lenses and the glass lenses, or the three of the glass lenses, the resin lenses, and the glass-resin composite lenses.

In consideration of the differences in optical characteristics of the glass lenses, the resin lenses, and the glass-resin composite lenses, the alignments thereof are adaptively adjusted according to different optical characteristics. In the case where the glass lenses and the resin lenses or the glass-resin composite lenses are both arranged in the traditional optical lenses, because the lenses in the traditional optical lenses are fixed, the lenses need to meet the requirement for overall optical consistency before leaving the factory to guarantee the consistency of central axes during camera module alignment when subsequently arranged on a photosensitive assembly. Otherwise, once the optical consistency of the lenses has a deviation, there will be a cumulative deviation of the overall optical consistency of the lenses and a cumulative deviation of the optical consistency of the camera modules, and consequentially, the imaging quality is low.

Thus, the invention provides a multi-group lens assembly comprising a plurality of independent lens group units. In this way, the number of lenses configured in each lens group unit is small, and the assembly error of each unit is small; and the total number of the lenses in the plurality of independent lens group units is large, so the requirement for high-pixel lenses are met. During being assembled to be a multi-group lens assembly, the lens group units are assembled in an active alignment manner to make sure that relative errors among the lens group units are small, so that the multi-group lens assembly has good optical characteristics. The multi-group lens assembly further comprises an assembly structure which is used for assembling two adjacent lens group units, so that all the lens group units are steadily assembled to form the multi-group lens assembly, guaranteeing the stability of the lens assembly and the optical characteristics by structural assembly. All lenses in the plurality of lens group units are made of any two or three of a glass material, a resin material, and a glass-resin composite material. Alternatively, all lenses are made of only the glass-resin composite material. The above assembly manner improves the alignment of the lenses having different optical characteristics, and a convenient adjustment manner effectively compensates for a deviation caused by the materials.

For the sake of a convenient explanation, a multi-group lens assembly comprising two lens group units, and a camera module are expounded, as examples, in the following embodiments of the invention. Of course, in other embodiments of the invention, the multi-group lens assembly may comprise three, four, or more lens group units, and the invention has no limitation in this aspect.

Figure 1:
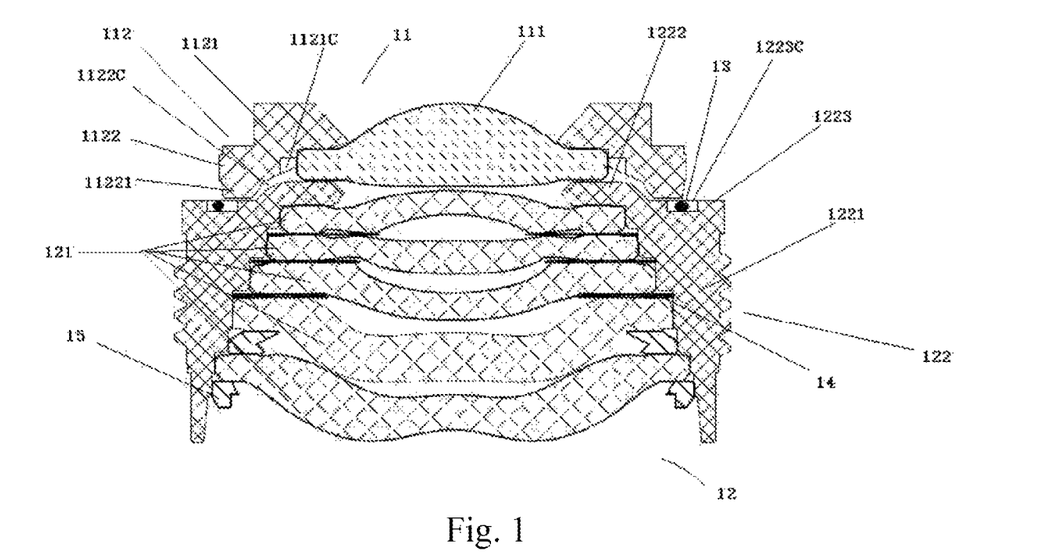
FIG. 1 is a sectional view of a multi-group lens assembly according to Embodiment 1 of the invention.
Figure 2:
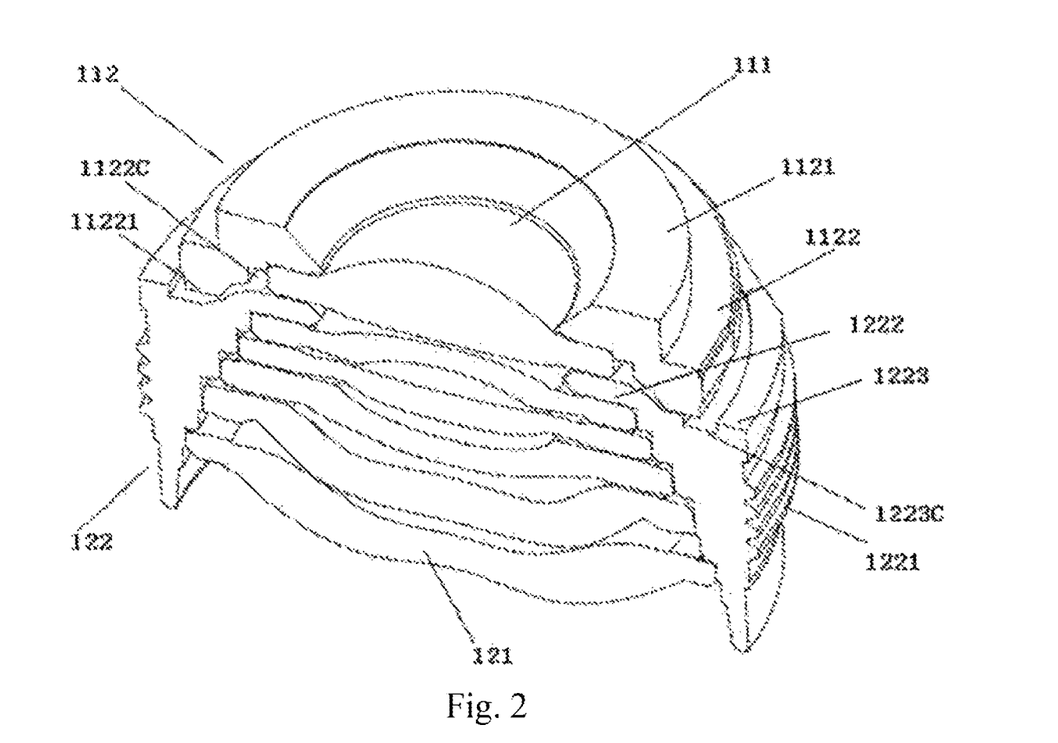
FIG. 2 is a perspective sectional view of the multi-group lens assembly according to Embodiment 1 of the invention.

FIG. 1 and FIG. 2 are schematic diagrams of a multi-group lens assembly in Embodiment 1 of the invention. The multi-group lens assembly comprises two lens group units which are respectively an upper lens group unit 11 and a lower lens group unit 12. The definition of the upper lens group unit and the lower lens group unit is not limited to distinguishing of two lens group units; in the case where three or more lens group units are configured, two adjacent lens group units are distinguished by an upper lens group unit and a lower lens group unit, wherein the lens group unit, closer to an object side, in two adjacent lens group units is referred to as the upper lens group unit, and the lens group unit, closer to an image side, in two adjacent lens group units is referred to as the lower lens group unit. For instance, there are a first lens group unit, a second lens group unit, and a third lens group unit, and the three lens group units are arranged from top to bottom in the direction of an optical axis, the first lens group unit is an upper lens group unit with respect to the second lens group unit, and the second lens group unit is a lower lens group unit with respect to the first lens group unit; and the second lens group unit is an upper lens group unit with respect to the third lens group unit, and the third lens group unit is a lower lens group unit with respect to the second lens group unit. The upper lens group unit 11 and the lower lens group unit 12 are cooperatively assembled through an assembly structure, that is, two adjacent lens group units are cooperatively assembled through the assembly structure.

A plurality of lenses in the multi-group lens assembly are respectively arranged in each of the lens group units in a lens group manner. In view of existing problems, the lenses are made of any two or three of a glass material, a resin material, and a glass-resin composite material. Alternatively, the lenses are made of only the glass-resin composite material. Generally, resin includes thermosetting resin and thermoplastic resin. The positions of the lenses and the number of the lenses can be adjusted as needed, and the number of the lenses is not limited herein. For instance, a first lens group unit has a glass lens and a resin lens, a second lens group unit has three resin lenses, and a third lens group unit has a glass-resin composite lens; and the number, materials, and up and down positions of the lenses in each of the above lens group units are not limited. Thus, the multi-group lens assembly formed by different numbers of lenses which are arranged at different positions and made of different materials, a camera module, and an electronic device can be effectively adjusted to guarantee optical axis consistency. In consideration of the cost, imaging effect, and wear resistance of the multi-group lens assembly, at least one glass lens or glass-resin composite lens is arranged in the lens group unit close to the object side of the multi-group lens assembly. Furthermore, in the lens group unit close to the object side of the multi-group lens assembly, the lens closest to the object side is a glass lens. Or, for the sake of special imaging effects, such as a large wide-angle fish-eye lens assembly, at least one glass lens or glass-resin composite lens is arranged in the lens group unit closest to an image side of the large wide-angle fish-eye lens assembly.

The upper lens group unit 11 includes an upper lens group 111 and an upper bearing part 112, wherein the upper lens group 111 includes at least one lens which is arranged in the upper bearing part 112 along an optical path.

The lower lens group unit 12 includes a lower lens group 121 and a lower bearing part 122, wherein the lower lens group 121 includes at least one lens which is arranged in the lower bearing part 122 along an optical path.

Specifically, the upper bearing part 112 of the upper lens group unit 11 includes an upper main bearing body 1121 and an upper outward extension part 1122. The upper main bearing body 1121 is a hollow structure capable of conveniently accommodating and installing the upper lens group 111, arranging the upper lens group 111 along the optical path, and the upper outward extension part 1122 extends outwards from the external part of the upper main bearing body 1121 to be overlapped with the lower bearing part 122 of the lower lens group unit 12. Specifically, the upper outward extension part 1122 extends outwards from the external part of the upper main bearing body 1121 with reference to the circumferential direction of the upper main bearing body 1121. The outward extension direction is not limited to the circumferential direction and generally refers to an outward extension away from the external part of the upper main bearing body 1121.

The lower bearing part 122 of the lower lens group unit 12 includes a lower main bearing body 1221, a lower inward extension part 1222, and a lower overlap part 1223. The lower main bearing body 1221 is a hollow structure capable of conveniently accommodating and installing the lower lens group 121, arranging the lower lens group 121 along the optical path, and the lower inward extension part 1222 extends inwards from the internal part of the lower main bearing body 1221 to enter the upper main bearing body 1121 and the upper outward extension part 1122. Specifically, the lower inward extension part 1222 extends inwards from the internal part of the lower main bearing body 1221 with reference to the circumferential direction of the lower main bearing body 1221. An inward extension direction is not limited to the circumferential direction and generally refers to an inward extension close to the internal part of the lower main bearing body 1221. The lower overlap part 1223 is arranged on the lower main bearing body 1221, and the upper outward extension part 1122 is overlapped with the lower overlap part 1223.

The lower overlap part 1223, the upper outward extension part 1122, and the lower inward extension part 1222 cooperatively form the assembly structure. The lower overlap part 1223 and the lower inward extension part 1222 are integrated with the lower main bearing body 1221 respectively, and the upper outward extension part 1122 is integrated with the upper main bearing body 1121. Or, the assembly structure is an independent part independent of the lens group units; and the lower overlap part 1223 and the lower inward extension part 1222 are connected to the lower main bearing body 1221 separately, and the upper outward extension part 1122 is connected to the upper main bearing body 1121 separately. Or, the structure is configured through the combination of integrated formation and separate connection. In view of assembly tolerances and stability, the integrated formation form is preferred.

The upper lens group unit 11 is arranged on the lower lens group unit 12, and when the upper outward extension part 1122 is overlapped with the lower overlap part 1223, the lower inward extension part 1222 extends into the upper main bearing body 1121 so as to be restrained by the upper lens group unit. That is, the lower inward extension part 1222 is limited in the upper lens group unit to be prevented against a large offset in the axial direction or/and circumferential direction of the multi-group lens assembly. Besides, the upper main bearing body 1121 limits the offset of the upper lens group 111 in the circumferential direction of the multi-group lens assembly. An upper main bearing body matching groove 1121C is formed in the internal side of the upper main bearing body 1121 to accommodate the lower inward extension part 1222 which extends into the upper main bearing body 1121.

In order to guarantee an adjustment space between the upper lens group unit 11 and the lower lens group unit 12 and further restrain the adjustment space in the axial direction and circumferential direction of the multi-group lens assembly, on the one hand, when the upper outward extension part 1122 is overlapped with the lower overlap part 1223, the lower inward extension part 1222 extends into a communicating space between the upper main bearing body 1121 and the upper outward extension part 1122 so as to be restrained by the upper main bearing body 1121 and the upper outward extension part 1122. That is, the lower inward extension part 1222 is simultaneously restrained by the upper main bearing body 1121 and the upper outward extension part 1122 in the axial direction and circumferential direction of the multi-group lens assembly to be prevented against a large offset, and nevertheless, the accommodating space of the upper main bearing body 1121 and the upper outward extension part 1122 provides a flexible adjustment range.

On the other hand, the upper outward extension part 1122 includes an upper extension part 11221 which extends towards the lower lens group unit 12 and is overlapped with the lower overlap part 1223 to be in cooperation with the lower inward extension part 1222 to realize the structural restraint in the axial direction and circumferential direction of the multi-group lens assembly. the lower inward extension part 1222 is further restrained by the upper extension part 11221 of the upper outward extension part 1122 and the upper main bearing body 1121 in the axial direction and circumferential direction of the multi-group lens assembly. The upper main bearing body 1121 further includes an upper main bearing body matching groove 1121C which is formed in the internal part of the upper main bearing body and is used for adhesive dispensing to mainly limit the offset of the upper lens group in the circumferential direction of the multi-group lens assembly. The upper outward extension part 1122 further includes an upper matching groove 1122C When communicated in the extension direction of the upper outward extension part 1122, the upper main bearing body matching groove 1121C and the upper matching groove 1122C provide a large space for the adjustment of the upper lens group unit and the lower lens group unit. The upper main bearing body matching groove 1121C is independently formed in the upper main bearing body 1121, the upper matching groove 1122C is independently formed in the upper outward extension part 1122, and in this case, the upper main bearing body matching groove 1121C does not communicate with the upper matching groove 1122C.

Besides, the upper matching groove 1122C is not limited to be formed in the upper outward extension part 1122, and in the case where the upper extension part 11221 is integrated with the upper outward extension part 1122, and when the upper extension part 11221 extends towards the lower lens group unit 12, the upper matching groove 1122C is formed in the internal side of the upper outward extension part 1122. The upper main bearing body matching groove 1121C and the upper matching groove 1122C are not limited to the above configuration manners.

In order to adjust the fixed positions of the upper lens group unit and the lower lens group unit to obtain high yield and imaging quality, an adjustment gap is reserved between the upper lens group unit and the lower lens group unit. Particularly, an adjustment gap is reserved between the upper main bearing body 1121 and the lower inward extension part 1222, between the bottom of the lens closest to the image side of the upper lens group unit 11 and the lower inward extension part 1222, between the upper outward extension part 1122 and the lower inward extension part 1222, or between the upper extension part 11221 and the lower overlap part 1223, or adjustment gaps are reserved in two or three or more of the above cases. In the above gap adjustment manners, the adjustment gap is reserved in terms of structural relative positions or the thicknesses or other sizes of related parts. The adjustment gap is 0.1%-300% of the minimum thickness of each lens and is about 2-600 μm.

A lower matching groove 1223C is formed in the lower overlap part 1223 to accommodate a bonding medium, a welding medium, or the above assembly structure. When the upper outward extension part 1122 is overlapped with the lower overlap part 1223, the lower matching groove 1223C is cooperatively fixed in the lower overlap part 1223 through the bonding medium 13, or the welding medium, or the assembly structure, and the relative positions of the upper lens group and the lower lens group are fixed after the positions of the upper lens group and the lower lens group are adjusted to be determined. The lower matching groove 1223C provides sufficient external exposure for the bonding medium 13 or the welding medium exposed to some extent, so during assembling the upper lens group unit and the lower lens group unit, after the bonding medium 13 or the welding medium is applied to the internal part of the lower matching groove 1223C, the upper lens group unit 11 and the lower lens group unit 12 are actively aligned, then ultraviolet radiation, infrared radiation, X-light radiation, laser radiation, and catalysis based on water vapors, oxygen, hydrogen, or the like are carried out in a region where the bonding medium 13 or the welding medium is applied to fast pre-cure the bonding medium or to fast melt the welding medium, and afterwards, the upper lens group unit 11 and the lower lens group unit 12 are further fixed to be assembled rapidly. Thus, the assembly time is shortened, and the production efficiency is improved.

To guarantee a sufficient light radiation area during adhesive dispensing or a sufficient exposure surface during laser welding and to realize effective exposure, the top of the lower overlap part 1223 is flush with the top of the lower matching groove 1223C. Furthermore, the lower matching groove 12230 is partially covered with a part of the upper outward extension part 1122 overlapped with the lower overlap part 1223 in the axial direction of the multi-group lens assembly, so that the lower matching groove 1223C is partially exposed to receive external processing substances such as incident light.

A space is reserved between the upper lens group unit and the lower lens group unit for adjustment and to provide a sufficient adhesive overflow space. To enhance the effect of fixation, the bonding medium is arranged in the space of the adjustment gap between the upper main bearing body 1221 and the lower inward extension part 1222, the space of the adjustment gap between the bottom of the lens closest to the image side of the upper lens group unit 11 and the lower inward extension part 1222, the space of the adjustment gap between the lower extension part 12231 and the upper outward extension part 1122, the space of the adjustment gap between the upper outward extension part 1122 and the lower inward extension part 1222, or the space of the adjustment gap between the upper extension part 11221 and the lower overlap part 1223, or the bonding medium is configured in one, two or three or more of the above cases (as shown in FIG. 1), Otherwise, the welding medium is arranged in the space of the adjustment gap between the upper extension part 11221 and the lower overlap part 1223 (referring to FIG. 6) to fix the relative positions of the upper lens group unit and the lower lens group unit after the positions of the upper lens group unit and the lower lens group unit have been adjusted and determined.

The bonding medium 13 can be, but is not limited to a UV adhesive, a thermosetting adhesive, a UV thermosetting adhesive, an epoxy resin adhesive, a pressure-sensitive adhesive, a moisture curing adhesive, and a light curing adhesive and can also be one or more of the above. The welding medium includes a metal part such as a metal sheet. The upper lens group unit and the lower lens group unit can be structurally restrained through an assembly structure, so that the upper lens group unit and the lower lens group unit can be assembled. The connection of the upper lens group unit 11 and the lower lens group unit 12 is not limited to the above manners and can be realized in the following manners such as riveted connection, threaded connection, pinned connection, wedged connection, and the like.

The optical axis consistency and the assembly time are two important aspects of lenses in actual production and application. With regard to the multi-group lens assembly of the invention, the determination of the relative positions of the lens group units is a significant way to guarantee the optical axis consistency. In the prior application of the present application, when external substances are applied to a lower matching groove 1223C for exposure, front exposure is adopted in most cases, that is, light beams directly irradiate the lower matching groove 1223C vertically. However, it is actually found that effective irradiation is not available, especially for the inner bottom close to the axis of a multi-group lens assembly in the lower matching groove 1223C. Since the inner bottom lacks sufficient irradiation, the exposure effect is poor and consequentially, the fixation stability and precision of an upper lens group unit and a lower lens group unit are affected. In this invention, both front exposure and side exposure are adopted, that is, when light irradiates the lower matching groove 1223C, the lower matching groove 1223C partially receives front light and partially receives side light because the top of the lower overlap part 1223 is flush with the top of the lower matching groove 1223C, or the lower matching groove is partially covered with the part of the upper outward extension part overlapped with the lower overlapped part in the axial direction of the multi-group lens assembly. When the light enters the inner part of the lower matching groove 1223C, especially the inner bottom in the lower matching groove 1223C, a high pre-curing speed and a good pre-curing effect of the UV thermosetting adhesive are achieved. Thus, the assembly manner of the invention can improve the assembly precision and shorten the assembly time, thus suitable for batch production.

In one embodiment of the invention, the upper lens group unit 11 includes a glass lens arranged on the upper bearing part. the lower lens group unit 12 includes five resin lenses which are sequentially arranged in the lower bearing part from top to bottom along the optical path. The upper lens group unit 11 includes a space ring (which is not shown in figures) arranged in cooperation with the upper lens group 111 to restrain light passing through the upper lens group 111 so as to provide a predetermined light path. The lower lens group unit 12 includes space rings 15 arranged in cooperation with the lower lens group 121 to restrain light passing through the lower lens group 121 so as to provide predetermined light. The lower lens group unit has a plurality of space rings 15. In this embodiment of the invention, the lower lens group unit has four space rings. If The lower lens group includes a first lens, a second lens, a third lens, and a fourth lens which are arrayed from the object side to the image side, and the space rings are sequentially arranged between the first lens and the second lens, between the second lens and the third lens, and between the third lens and the fourth lens respectively. Besides, the space rings can be replaced by other ways such as coating on the lenses.

Figure 3:
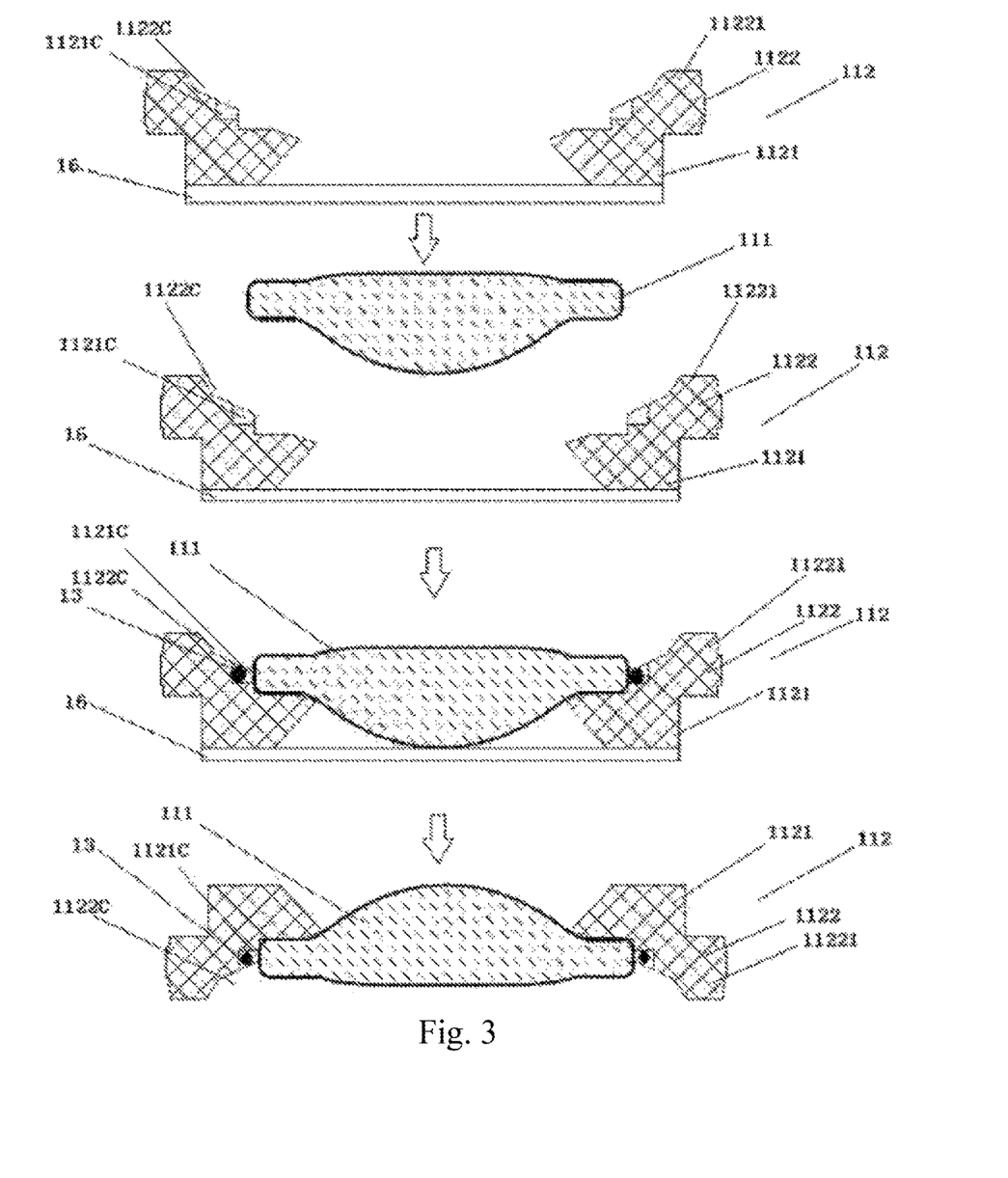
FIG. 3 is an assembly diagram of an upper lens group unit in the multi-group lens assembly according to Embodiment 1 of the invention.
Figure 4:
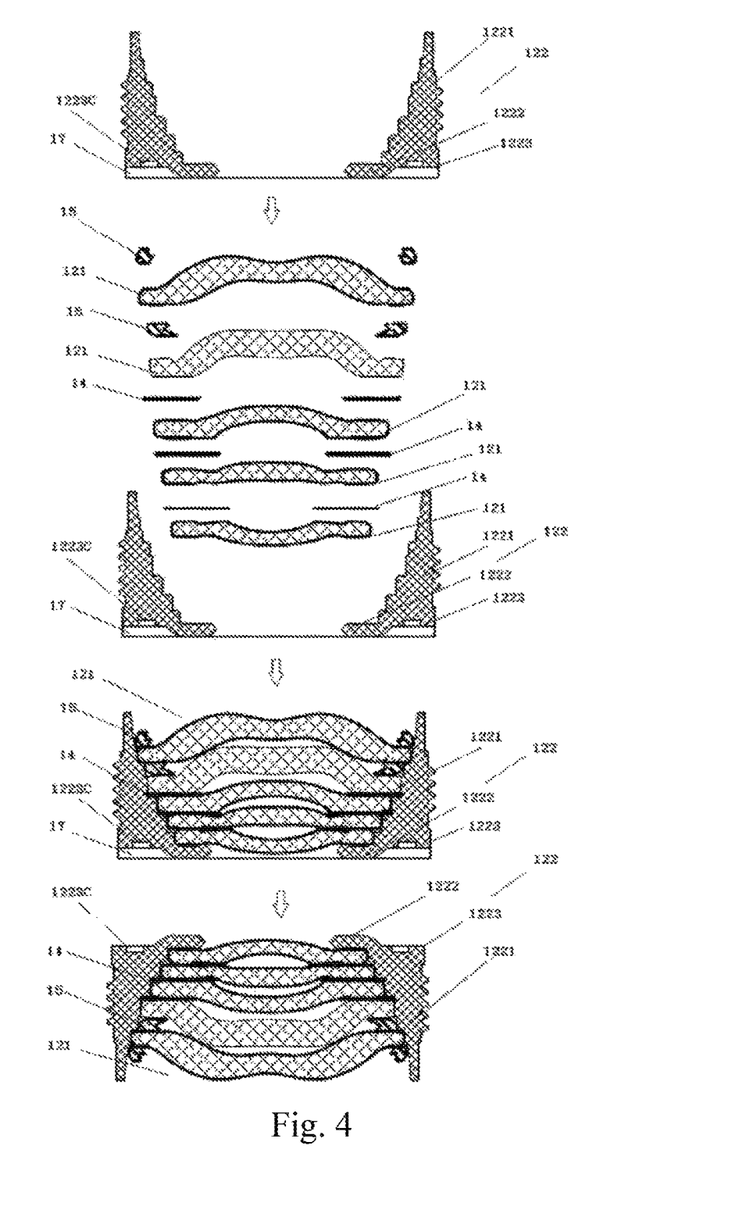
FIG. 4 is an assembly diagram of a lower lens group unit in the multi-group lens assembly according to Embodiment 1 of the invention.

As shown in FIG. 3, the assembly process of the upper lens group unit 11 in Embodiment 1 of the invention is specifically as follows: the upper bearing part 112 of the upper lens group unit 11 is inversely arranged on an upper lens group unit assembly table 16 first, then the first lens group 111 is assembled at the corresponding position in the upper bearing part 112, and afterwards, the space ring is assembled in the upper bearing part 112; and if there is a press ring, the press ring also needs to be assembled in the upper bearing part 112, and the space rings/press ring are sequentially arranged between the lenses. Afterwards, the bonding medium is applied to the position of the lens to be bonded and fixed. In this way, the assembly of the upper lens group unit 11 is finished. As shown in FIG. 4, the assembly of the lower lens group unit 12 in Embodiment 1 of the invention is conducted on a lower lens group unit assembly table 17, which can be reference to the assembly sequence of the upper lens group unit in FIG. 3.

It should be noted that the whole multi-group lens assembly is composed of a plurality of lens group units, so the number of the lenses in each lens group unit is relatively small, such as one, two, three, four, or the like. The total number of lenses of the multi-group lens assembly is obtained through addition of the numbers of lenses in all the lens group units, so that the number is large such as six, seven, eight, or the like. Thus, the multi-group lens assembly has high resolution and is suitable for a high-pixel camera module. In the assembly process, the optical axes of the lens group units can be kept consistent through active alignment of the lens group units, so that the multi-group lens assembly has fewer accumulative errors and higher imaging quality.

Figure 5:
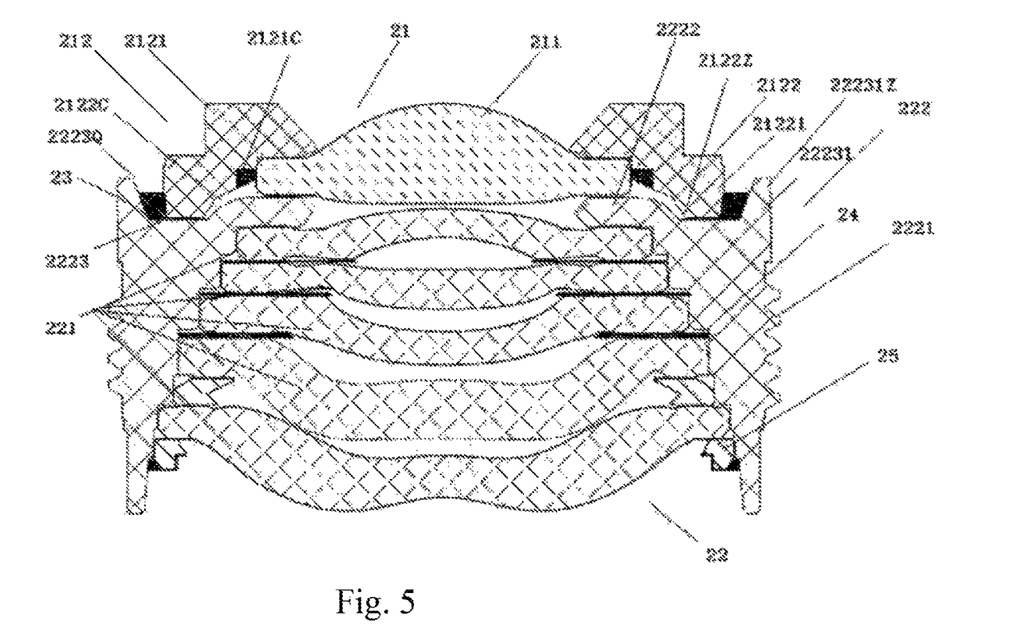
FIG. 5 is a sectional view of a multi-group lens assembly according to Embodiment 2 of the invention.

FIG. 5 shows a multi-group lens assembly in Embodiment 2 of the invention. The multi-group lens assembly in Embodiment 2 has the characteristics disclosed in Embodiment 1. Compared with Embodiment 1, in Embodiment 2, a lower overlap part 2223 of a lower bearing part 222 of a lower lens group unit 22 in the multi-group lens assembly includes a lower extension part 22231 extending towards an upper lens group unit 21. When the lower extension part 22231 extends towards the upper lens group unit 21, the lower extension part 22231 and a lower inward extension part 2222 cooperatively limit an upper outward extension part of an upper bearing part 212 on two sides of the bottom of the lower overlap part 2223, including the bottom of the upper outward extension part or an upper extension part, or the bottom of the upper outward extension part and the upper extension part, so that the adjustment ranges of the upper lens group unit and the lower lens group unit during assembly are limited. The lower extension part 22231 shields a part of light. When the lower extension part 22231 is long enough, an outward extension end of the lower extension part 22231 is a free end, and the maximum extension distance of the free end 22231Z of the lower extension part reaches the uppermost end of the multi-group lens assembly, that is, the free end 22231Z of the lower extension part can extend to be flush with the uppermost end of the multi-group lens assembly. In this way, displacement and offsets are further limited. Besides, in the case where the lower extension part 22231 is configured, a lower matching groove can be omitted.

Figure 7:
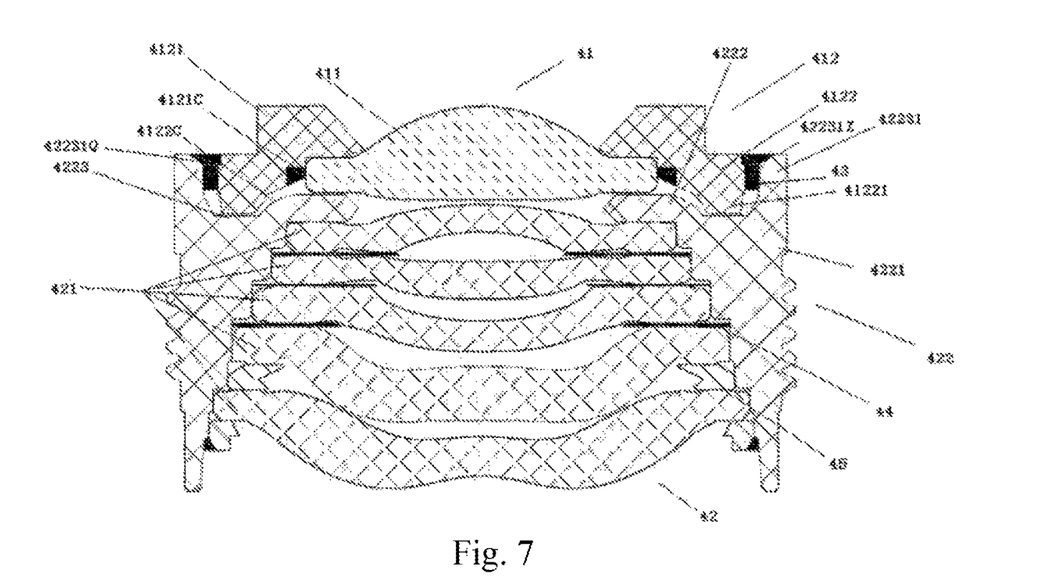
FIG. 7 is a sectional view of a multi-group lens assembly according to Embodiment 4 of the invention.

Furthermore, the free end 22231Z of the lower extension part 22231 at least can extend to be flush with a free end 2122Z of the upper outward extension part. Embodiment 4 is implemented based on Embodiment 2. Different from Embodiment 2, Embodiment 4 shows that a free end 42231Z of a lower extension part is flush with a free end 4122Z of an upper outward extension part in FIG. 7. The free end 42231Z of the lower extension part refers to the end of the upper outward extension part facing the lower lens group unit 22, so that the lower extension part 22231 has a certain height and the lower extension part 22231 can limit the displacement of the upper outward extension part 2122 overlapped with the lower overlap part 2223 to a certain extent. Thus, the assembly stability is guaranteed, great offset of the axis during assembly is prevented to a certain extent, and the active alignment is facilitated.

Similar to the adjustment gap in Embodiment 1, an adjustment gap is arranged between the lower extension part 22231 and the upper outward extension part 2122. A bonding medium 23/welding medium is arranged in a space of the adjustment gap. To guarantee effective exposure of the bonding medium/welding medium, for example incident light irradiation is large, the whole internal side of the lower extension part is an inclined plane, or part of the internal side of the lower extension part is an inclined plane (in Embodiment 4 shown in FIG. 7). That is, at least the part close to the upper face of the lower extension part is an inclined plane. The inclined plane inclines towards the axis of the multi-group lens assembly from the top of the lower extension part 22231 to reach the bottom of the lower extension part 22231 or to reach some part of the lower extension part 22231. Besides, since the lower extension part 22231 exists, a lower matching groove in Embodiment 4 can be omitted.

Figure 6:
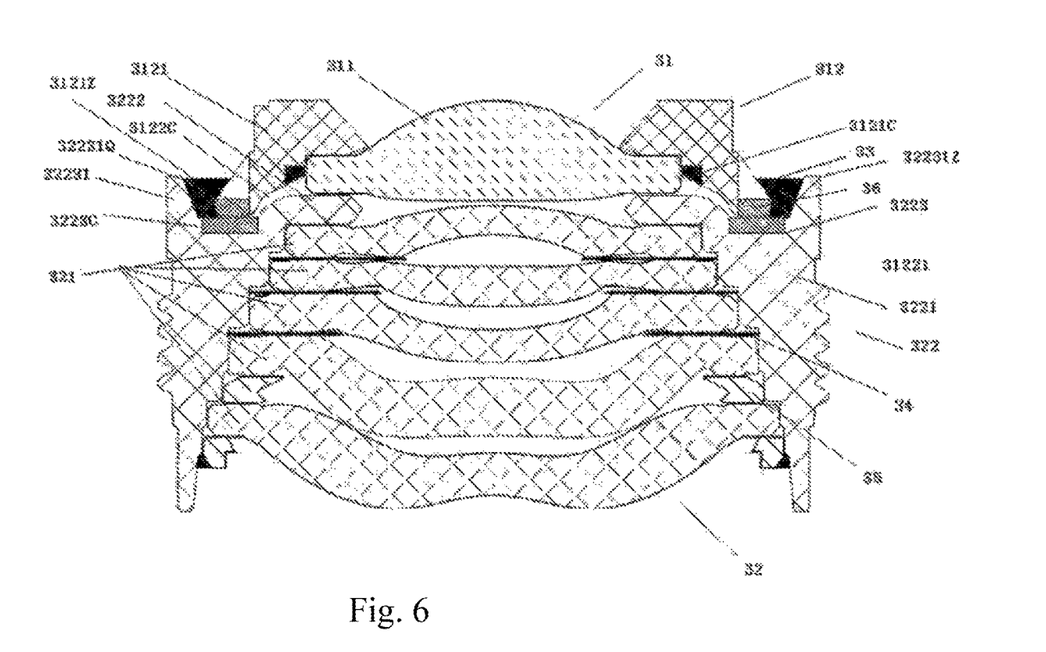
FIG. 6 is a sectional view of a multi-group lens assembly according to Embodiment 3 of the invention.

FIG. 6 shows a multi-group lens assembly in Embodiment 3 of the invention. Embodiment 3 is different from Embodiment 1 mainly in that an upper bearing part 312 includes an upper main bearing body 3121. The upper lens group 111 is arranged on the upper main bearing body 3121. A lower bearing part 322 includes a lower main bearing body 3221, a lower inward extension part 3222, and a lower overlap part 3223. A lower lens group 321 is arranged on the lower main bearing body 3221. The lower inward extension part 3222 extends inwards from the lower main bearing body 3221. The lower overlap part 3223 is arranged on the lower main bearing body 3221. The lower overlap part 3223 and the lower inward extension part 3222 form an assembly structure cooperatively. When the upper main bearing body 3121 is overlapped with the lower overlap part 3223, the lower inward extension part 3222 extends into the upper main bearing body 3121 so as to be restrained by the upper main bearing body 3121. As shown in FIG. 6, in Embodiment 3, a lower matching groove 3223C can be exposed to an external environment to the maximum extent for facilitating effective exposure. Other contents, such as adhesive dispensing manners, the adjustment gaps, and the like, disclosed in Embodiment 3 are identical to those disclosed in Embodiment 1, and are not repeated here. A lower extension part 32231 of the multi-group lens assembly in Embodiment 3 also has contents relating to the lower extension part 22231 in Embodiment 2.

A free end 32231Z of the lower extension part 32231 at least extends to be flush with a free end 3121Z of the upper main bearing body. When the free end 32231Z of the lower extension part 32231 is flush with the free end 3121Z of the upper main bearing body, the space between the lower extension part 32231 and the upper main bearing body is used for accommodating a bonding medium or a welding medium. The relative assembly positions of the lower extension part 32231 and the upper main bearing body can be adjusted. However, the lower extension part 32231 is not high enough, specifically, a height difference between the free end 32231Z of the lower extension part 32231 and the free end 3121Z of the upper main bearing body is not large enough, and consequentially, the lower extension part 32231 and the upper main bearing body 3121 cannot be effectively restrained in the circumferential direction of the multi-group lens assembly. Embodiment 3 in FIG. 6 shows that the free end 32231Z of the lower extension part is higher than the free end 3121Z of the upper main bearing body. The free end 3121Z of the upper main bearing body refers to an end facing a lower lens group unit 32, so that the lower extension part 32231 has a certain height, thereby limiting the displacement of the upper main bearing body 3121 overlapped with the lower overlap part 3223 to a certain extent. Thus, the assembly stability is guaranteed, large offset of the axis is prevented during assembly to a certain extent, and the active alignment is facilitated.

The lower matching groove 3223C between the lower extension part 32231 and the lower inward extension part 3222 is formed in the lower overlap part 3223 to accommodate a bonding medium or a welding medium.

Figure 8:
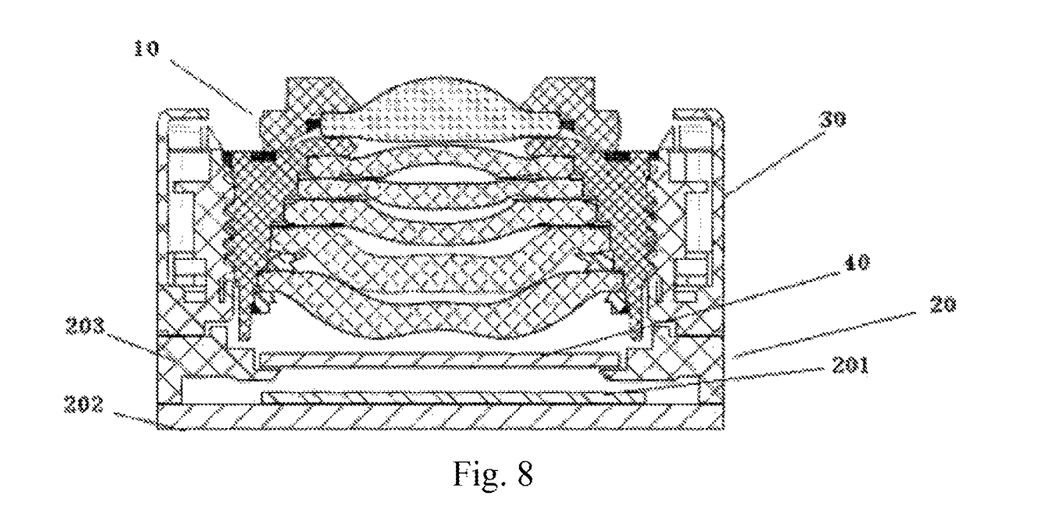
FIG. 8 is a sectional view of a camera module based on the multi-group lens assembly according to Embodiment 1 of the invention.

FIG. 8 shows a camera module formed based on the multi-group lens assembly 10 according to Embodiment 1 of the invention. The camera module provided with the multi-group lens assembly according to Embodiment 1 is illustrated as an example in the invention. The camera module can also be provided with the multi-group lens assembly according to Embodiment 2, Embodiment 3, Embodiment 4, or modifications of the above embodiments. The camera module is an automatic-focusing camera module and comprises the multi-group lens assembly 10, a photosensitive assembly 20, and a drive element 30, wherein the multi-group lens assembly 10 is located at a photosensitive path of the photosensitive assembly 20 to acquire image information through the photosensitization of the photosensitive assembly 20. The multi-group lens assembly 10 is installed on the drive element, so that the focal length of the camera module can be adjusted through an adjustment of the multi-group lens assembly 10. The chive element 30 is exemplified by, but is not limited to, a voice coil motor, a piezoelectric motor, or the like, and is electrically connected to the photosensitive assembly 20.

The photosensitive assembly 20 includes a photosensitive element 201, a circuit board 202, and a base 203, wherein the photosensitive element 201 is electrically connected to the circuit board 202, for instance, the photosensitive element 201 is arranged on the circuit board 202 in a surface mount manner and is electrically connected to the circuit board 202 through an electrical connection wire. The base 203 is installed on the circuit board 202. The drive element 30 is installed on the base 203, and the multi-group lens assembly 10 is located at the photosensitive path of the photosensitive element 201 and has a central optical axis consistent with that of the photosensitive element 201.

The camera module further includes an optical filter element 40 which is installed on the base 203 and is located between the multi-group lens assembly 10 and the photosensitive element 201. That is, light passing through the multi-group lens assembly 10 is filtered by the optical filter element 40 and then reaches the photosensitive element 201. The optical filter element 40 is exemplified by, but is not limited to, an IR cut-off filter or a blue glass filter.

Figure 10:
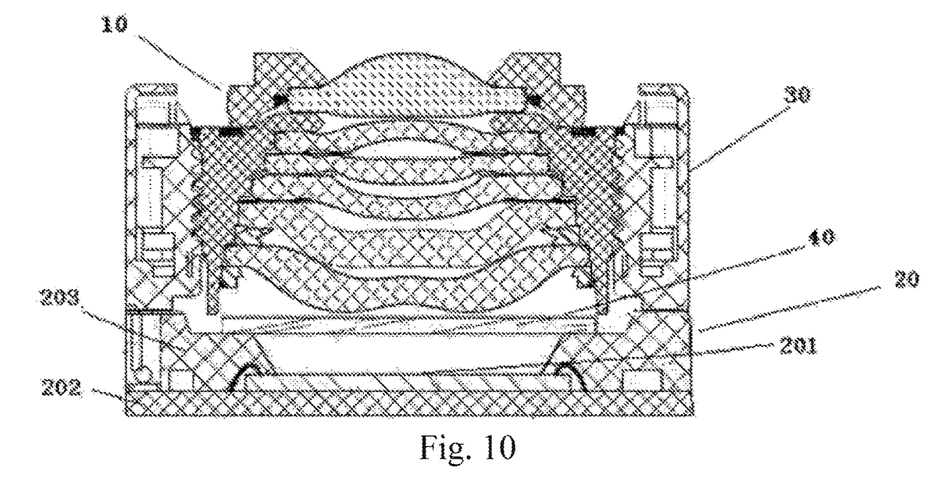
FIG. 10 is a sectional view of a camera module in another embodiment based on the multi-group lens assembly according to Embodiment 1 of the invention.
Figure 11:
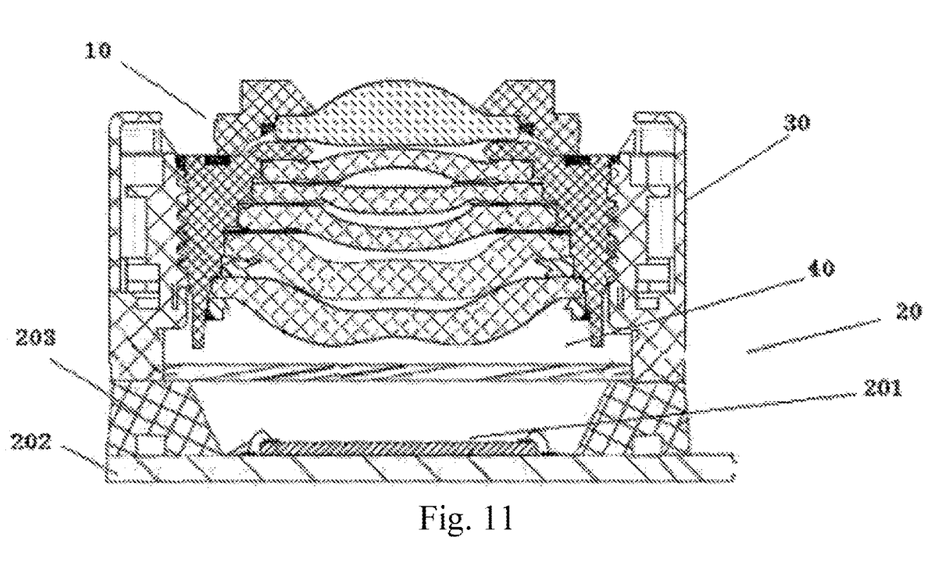
FIG. 11 is a sectional view of a camera module in another embodiment based on the multi-group lens assembly according to Embodiment 1 of the invention.

The base is formed by molding and is not limited to the structure shown in FIG. 8, and the base can be structurally modified with feasibility under the precondition where the above functions can be realized. For instance, the base can be designed as the structure shown in FIG. 10 and FIG. 11.

Figure 9:
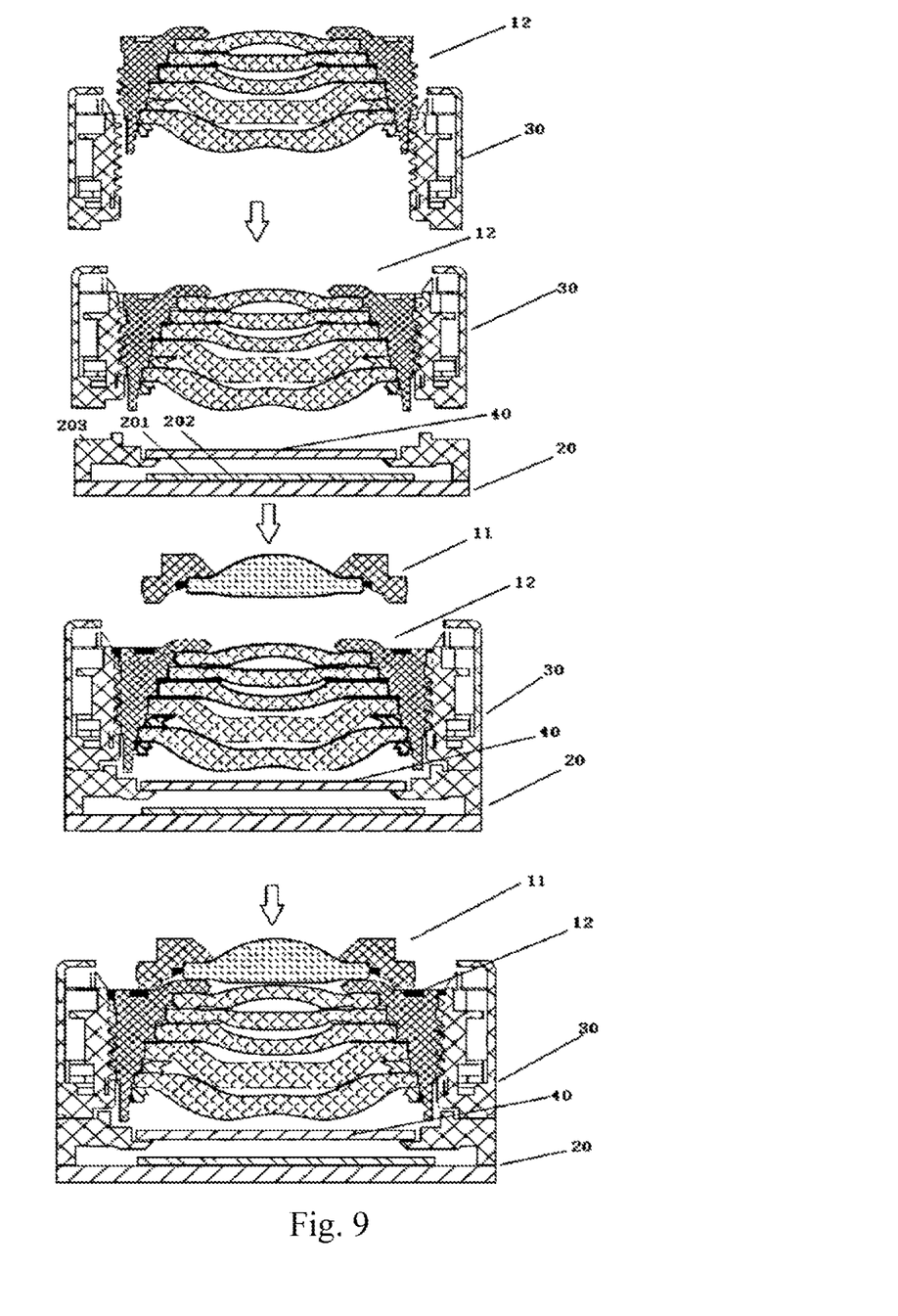
FIG. 9 is an assembly diagram of the camera module in FIG. 8.

FIG. 9 shows an assembly method of the camera module shown in FIG. 8. On the basis that the upper lens group unit 11 and the lower lens group unit 12 are assembled or obtained, the photosensitive element 201, the circuit board 202, the base 203, and the optical filter element 40 are assembled to obtain the photosensitive assembly 20 first, the lower lens group unit 12 is assembled on the drive element 30 to form a drive lens assembly, then the drive lens assembly is assembled on the photosensitive assembly, afterwards, the upper lens group unit 11 is assembled on the lower lens group unit 12. The active alignment is carried out to make an optical axis of the multi-group lens assembly 10 consistent with the central optical axis of the photosensitive element 201, and finally the upper lens group unit 11 is fixed, so that the camera module is obtained.

It should be noted that in the assembly process of the drive lens assembly and the photosensitive assembly 20, the assembly error of the drive lens assembly and the photosensitive assembly 20 is preferably small or within a preset range to obtain a good-quality camera module in a subsequent assembly process such as an active alignment process. Of course, the drive lens assembly and the photosensitive assembly 20 can be assembled in an active alignment manner to lay a good foundation for assembly. Besides, the drive lens assembly and the photosensitive assembly 20 can be assembled in a VA (VAM Attach) manner to make the assembly error within a preset range.

The camera module can also be assembled in another manner (which is not shown in figures): on the basis that the upper lens group unit 11 and the lower lens group unit 12 are assembled or obtained, the upper lens group unit 11 and the lower lens group unit 12 are assembled to obtain the multi-group lens assembly 10; the multi-group lens assembly and the drive element 30 are assembled to obtain the drive lens assembly; the photosensitive element 201, the circuit board 202, the base 203, and the optical filter element 40 are assembled to obtain the photosensitive assembly 20, and afterwards, the drive lens assembly is assembled on the photosensitive assembly 20, so that the camera module is obtained.

The drive lens assembly and the photosensitive assembly 20 can be assembled in the active alignment manner.

In addition, the camera module can also be a fixed-focus camera module (which is not shown in figures) comprising a multi-group lens assembly and a photosensitive assembly, wherein the photosensitive assembly includes a photosensitive element, a circuit board, and a base. The photosensitive element is electrically connected to the circuit board through an electrical connection wire. The base is installed on the circuit board. A drive element is installed on the base, and the multi-group lens assembly is located at a photosensitive path of the photosensitive element and has a central optical axis consistent with that of the photosensitive element. The camera module further comprises an optical filter element which is installed on the base. The optical filter element can be reversely attached to the base.

On the basis of the above embodiments, the invention further provides a method for assembling the multi-group lens assembly. Taking the multi-group lens assembly in Embodiment 1 as an example, the method particularly comprises the following steps:

S01, the two lens group units 11, 12 are assembled;

S02, relative positions of the two lens group units 11, 12 are determined in an active alignment manner; and S03, the two lens group units 11, 12 are fixed to form the multi-group lens assembly 10.

In S01, the assembly structure is arranged on each lens group unit to realize cooperative assembly of the two lens group units. Please refer to the structure of the upper lens group unit 11 and the lower lens group unit 12 in the above embodiments or combinations or equivalents of the embodiments for specific details. The two lens group units are cooperated and restrained structurally, and thus a small assembly error is achieved and the assembly is easy to implement.

In S02, if glue is adopted, pre-fixation can be carried out. For instance, the UV thermosetting adhesive is applied first, then the active alignment is carried out, and finally, UV irradiation is carried out to pre-fix the lens group units. The pre-fixation can also be implemented through other manners. For instance, the upper lens group unit and the lower lens group unit are subjected to the active alignment first and are then pre-fixed with the bonding medium. If a welding manner is adopted, the upper lens group unit and the lower lens group unit are subjected to the active alignment first and are then welded to be fixed. Besides, the upper lens group unit and the lower lens group unit can also be fixed by heating and roasting.

Specifically, taking Embodiment 1 as an example, when the upper lens group 111 has only one glass lens, the glass lens is fixed to the upper bearing part 112 in a clamped manner; and the lower lens group 121 has five resin lenses which are fixed to the lower bearing part 122 in a clamped manner. After the lenses are clamped on the bearing parts, the bonding medium is dispensed between the lenses and the bearing parts to improve the clamping stability of the lenses and to avoid optical axis deviation caused by lens offset, which may otherwise affect imaging quality. In this way, in the whole assembly process of the multi-group lens assembly in Embodiment 1, the bonding medium is dispensed once to fix the upper and lower lens group units or is dispensed twice to fix the lenses and the upper and lower lens group units respectively, so that the multi-group lens assembly 10 is packaged more stably and firmly and has good airtightness.

The method for assembling the camera module with the multi-group lens assembly in Embodiment 1 of the invention comprises the following steps:

S11, one lens group unit and the drive element 30 are assembled to obtain the drive lens assembly;

S12, the drive lens assembly is assembled on the photosensitive assembly 20; and S13, another lens group unit is assembled on the drive lens assembly to form the camera module.

In steps S11 and S13, the number of the lens group units is not limited to two. In the case where a plurality of lens group units are configured, in step S11, at least one lens group unit and the drive element are assembled to obtain the drive lens assembly, and the plurality of lens group units are sequentially arranged on the drive element according to the above-mentioned assembly manner in this application and are installed in an active alignment manner. In step S13, at least one of the uninstalled lens group units is assembled on the drive lens assembly, and the plurality of lens group units are sequentially arranged on the drive lens assembly and are installed in an active alignment manner.

Or, the method for assembling the camera module comprises the following steps:

S11', two lens group units are assembled to obtain the multi-group lens assembly 10;

S12', the multi-group lens assembly 10 and the drive element 30 are assembled to obtain the drive lens assembly; and S13', the drive lens assembly is assembled on the photosensitive assembly 20 to form the camera module.

In S11', the number of the lens group units is not limited to two. In the case where a plurality of lens group units are configured, the plurality of lens group units are assembled subsequently according to the above-mentioned assembly manner in this application to obtain the multi-group lens assembly, and the plurality of lens group units are installed in an active alignment manner.

The multi-group lens assembly can be assembled on and applied to different types of camera modules. The camera module can be applied to an electronic device. The electronic device is exemplified by, but is not limited to, a smart phone, a wearable device, a computer device, a television, a vehicle, a camera, a monitoring device, or the like.

Those skilled in the art should appreciate that the above embodiments shown in the descriptions and the accompanying drawings are only illustrative ones of the invention, and are not intended to limit the invention. The objective of the invention is achieved completely and effectively. The functions and structural principle of the invention are shown and expounded in the embodiments which can be arbitrarily transformed or modified without deviating from the principle.

What is claimed is:

1. A multi-group lens assembly, comprising:
  a plurality of lens group units, in which two adjacent lens group units are assembled by using at least one assembly structure wherein lenses in each said lens group unit are made of any two or three of a glass material, a resin material, and a glass-resin composite material, or are made of only the glass-resin composite material;
  a first lens group unit, close to an object side, including a first lens group and a first bearing part allowing the first lens group to be arranged therein;
  a second lens group unit, close to an image side, including a second lens group and a second bearing part allowing the second lens group to be arranged therein, wherein the first bearing part is assembled on the second bearing part via the assembly structure and the second bearing part includes:
    a second main bearing body allowing the second lens group to be arranged therein;
    a second inward extension part extending inwards from the second main bearing body to space between the first lens group and the second lens group; and a second overlap part arranged on the second main bearing body, wherein when the first bearing part is overlapped with the second overlap part, the second inward extension part extends into the first bearing part, so as to be restrained by the first lens group unit, the second overlap part includes a second extension part extending towards the first lens group unit, at least a part, close to an upper face of the second extension part, of an internal side of the second extension part is an inclined plane, an adjustment gap is reserved between the first lens group unit and the second lens group unit, and the adjustment gap is 0.1%-300% of the lens having a minimum thickness in the plurality of lens group units.

2. The multi-group lens assembly according to claim 1, wherein the lens group unit closest to an object side includes at least one glass lens or glass-resin composite lens.

3. The multi-group lens assembly according to claim 2, wherein the lens closest to the object side in the lens group unit closest to the object side is a glass lens or a glass-resin composite lens.

4. The multi-group lens assembly according to claim 1, wherein the lens group unit closest to an image side includes at least one glass lens or glass-resin composite lens.

5. The multi-group lens assembly according to claim 1, wherein the assembly structure is an independent part independent of the lens group units.

6. The multi-group lens assembly according to claim 1, wherein the first bearing part further comprises:
a first main bearing body allowing the first lens group to be arranged therein; and
a first outward extension part extending outwards from the first main bearing body, wherein the second overlap part, the first outward extension part, and the second inward extension part form the assembly structure cooperatively, and, when the first outward extension part is overlapped with the second overlap part, the second inward extension part extends into the first main bearing body, so as to be restrained by the first lens group unit.

7. The multi-group lens assembly according to claim 6, wherein the first outward extension part further comprises:
a first extension part extending towards the second lens group unit.

8. The multi-group lens assembly according to claim 7, wherein the adjustment gap is reserved between the first extension part and the second overlap part.

9. The multi-group lens assembly according to claim 6, wherein the first main bearing body has a first main bearing body matching groove, the first outward extension part includes a first extension part extending towards the second lens group unit and a first matching groove, and the first main bearing body matching groove communicates with the first matching groove in an extension direction of the first outward extension part.

10. The multi-group lens assembly according to claim 6, wherein the adjustment gap is reserved between the first lens group unit and the second inward extension part.

11. The multi-group lens assembly according to claim 6, wherein the adjustment gap is reserved between the first outward extension part and the second inward extension part.

12. The multi-group lens assembly according to claim 6, wherein a second matching groove is formed in the second overlap part to accommodate one or more of a bonding medium, a welding medium, and the assembly structure.

13. The multi-group lens assembly according to claim 1, wherein the adjustment gap is reserved between the second extension part and the first outward extension part.

14. The multi-group lens assembly according to claim 1, wherein the first bearing part includes a first main bearing body allowing the first lens group to be arranged therein, wherein the second overlap part and the second inward extension part form the assembly structure cooperatively; and when the first main bearing body is overlapped with the second overlap part, the second inward extension part extends into the first main bearing body, so as to be restrained by the first lens group unit.

15. The multi-group lens assembly according to claim 14, wherein the adjustment gap is reserved between the first lens group unit and the second inward extension part.

16. The multi-group lens assembly according to claim 1, wherein the adjacent lens group units are assembled in an active alignment manner.

17. A method for assembling the multi-group lens assembly according to claim 1, comprising:
step S01, assembling the lens group units;
step S02, determining relative positions of adjacent lens group units in an active alignment manner; and
step S03, fixing the lens group units to form the multi-group lens assembly.

* * * * *